United States Patent [19]

Shimizu

[11] Patent Number: 4,812,723
[45] Date of Patent: Mar. 14, 1989

[54] MOTOR-OPERATED BRAKE SYSTEM

[75] Inventor: Yasuo Shimizu, Saitama, Japan

[73] Assignee: Honda Giken Kogyo Kabushiki Kaisha, Tokyo, Japan

[21] Appl. No.: 70,933

[22] Filed: Jul. 7, 1987

[30] Foreign Application Priority Data

Jul. 7, 1986 [JP] Japan ................................. 61-159303

[51] Int. Cl.$^4$ ........................... B60T 13/66; F15B 9/14
[52] U.S. Cl. ....................................... 318/488; 60/545; 303/114; 74/388 PS
[58] Field of Search ........................ 303/2, 3, 20, 114; 188/18 R, 157; 318/488, 671, 675, 677; 60/533, 545, 538; 74/388 PS

[56] References Cited

U.S. PATENT DOCUMENTS

| 3,048,979 | 8/1962 | Grigsby et al. | 60/545 |
| 4,531,419 | 7/1985 | Botz et al. | 74/388 PS |
| 4,686,433 | 8/1987 | Shimizu | 318/488 X |

FOREIGN PATENT DOCUMENTS

| 0573144 | 3/1959 | Canada | 60/545 |
| 2125913 | 3/1984 | United Kingdom | 60/545 |

Primary Examiner—Bentsu Ro
Attorney, Agent, or Firm—Lyon & Lyon

[57] ABSTRACT

A motor-operated brake system includes an input rod coupled to a brake pedal and displaceable with an axial thrust force commensurate with the depressing force on the brake pedal, a cylinder having at least one piston operable by the thrust force applied to the input rod for producing hydraulic pressure, the cylinder having a piston, a hydraulic pressure transmitting device for transmitting the hydraulic pressure generated by the cylinder to braking mechanisms associated respectively with wheels, a servo mechanism including an electric motor for producing rotational motion and a converting mechanism for converting the rotational motion from the electric motor to linear motion and transmitting the linear motion to the piston of the cylinder, the servo mechanism being arranged to apply an amplified force to the piston of the cylinder, a thrust detector for detecting the magnitude of the thrust force applied to the input rod, and a control device responsive to a signal from the thrust detector for generating a motor control signal to control operation of the electric motor.

4 Claims, 4 Drawing Sheets

MOTOR-OPERATED BRAKE SYSTEM

FIELD OF THE INVENTION

The present invention relates to a motor-operated brake system including an electric motor for producing amplified braking force.

DESCRIPTION OF THE RELEVANT ART

As disclosed in Japanese Patent Publication No. 48-26711, for example, a conventional automobile brake system includes a push rod coupled to a brake pedal and pushed by a thrust force applied from the brake pedal as it is depressed by the driver, a cylinder unit for converting the thrust force applied to the push rod to hydraulic pressure, a pressure transmitting device for transmitting the hydraulic pressure from the cylinder to drum- or disc-type braking mechanisms associated with respective wheels, and a servomechanism for amplifying the thrust force from the push rod with intake vacuum of the engine and applying the amplified force to the piston of the cylinder unit in order to obtain a strong braking force with a small depressing force imposed on the brake pedal. Therefore, the braking force can be increased by generating increased hydraulic pressure from the cylinder unit even when the depressing force on the brake pedal is small.

Since the servomechanism is actuated by the intake vacuum of the engine, the outside diameter of the diaphragm of the servomechanism should be increased in order to produce increased force. With the increased outside diameter of the servomechanism diaphragm, however, the servomechanism is of a large size and requires a large installation space, imposing limitations on the layout thereof within an engine compartment. Dependent on the arrangement of the engine in the engine compartment, the vacuum pipe from an intake manifold may not appropriately be installed for connection to the servomechanism. Another problem is that when the engine is not in operation, the servomechanism is not actuated and hence no sufficient braking force can be generated by depressing the brake pedal deeply.

SUMMARY OF THE INVENTION

It is an object of the present invention to provide a motor-operated brake system which can produce sufficient braking force reliably even when the engine is shut off, requires no vacuum pipe from the engine, can generate sufficient braking force with an electric motor of a relatively small capacity, and is small in size.

According to the present invention, there is provided a motor-operated brake system including an input rod coupled to a brake pedal and displaceable with an axial thrust force commensurate with the depressing force on the brake pedal, cylinder means having at least one piston operable by the thrust force applied to the input rod for producing hydraulic pressure, the cylinder means having a piston, hydraulic pressure transmitting means for transmitting the hydraulic pressure generated by the cylinder means to braking mechanisms associated respectively with wheels, servo means including an electric motor for producing rotational motion and a converting mechanism for converting the rotational motion from the electric motor to linear motion and transmitting the linear motion to the piston of the cylinder means, the servo means being arranged to apply an amplified force to the piston of the cylinder means, thrust detecting means for detecting the magnitude of the thrust force applied to the input rod, and control means responsive to a signal from the thrust detecting means for generating a motor control signal to control operation of the electric motor.

The above and further objects, details and advantages of the present invention will become apparent from the following detailed description of a preferred embodiment thereof, when read in conjunction with the accompanying drawings.

Figure 3:
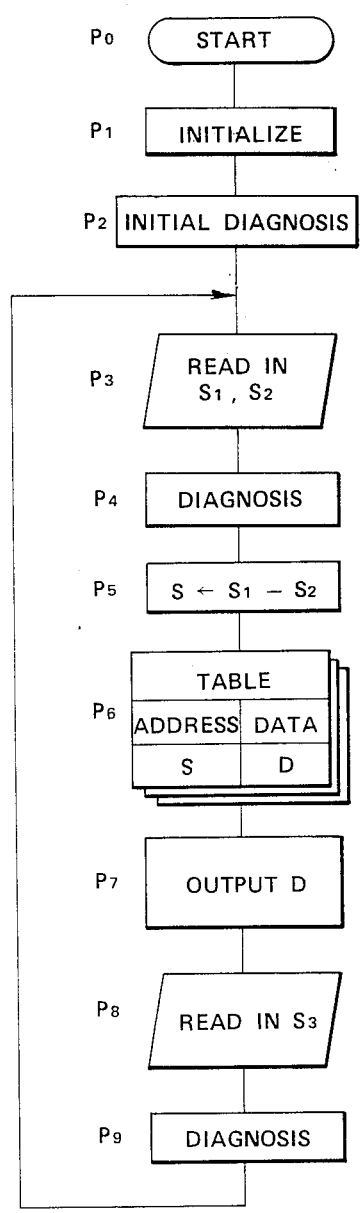
Figure 4:
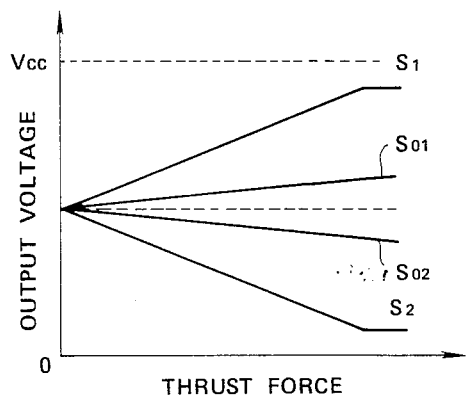
Figure 5:
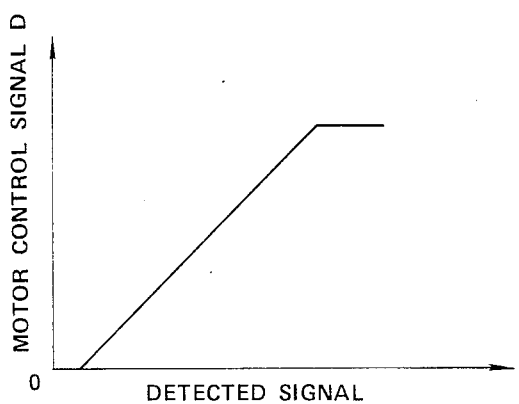

FIG. is a block diagram of a control device in the motor-operated brake system;

FIG. 3 is a flowchart of a control sequence executed by the control device;

FIG. 4 is a graph showing a thrust force signal;

FIG. 5 is a graph showing a motor control signal; and

Figure 6:
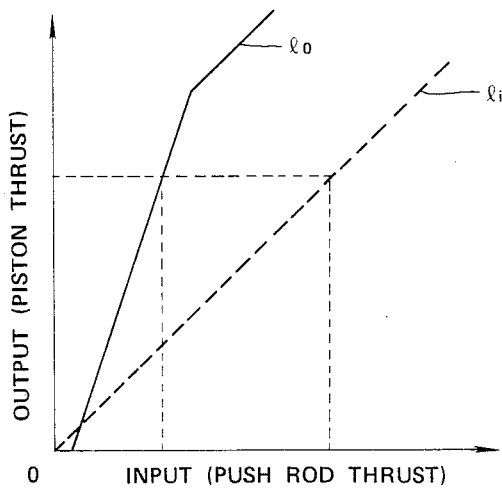

FIG. 6 is a graph showing the relationship between a push rod thrust force and a piston thrust force.

DETAILED DESCRIPTION OF THE PREFERRED EMBODIMENT

Figure 1:
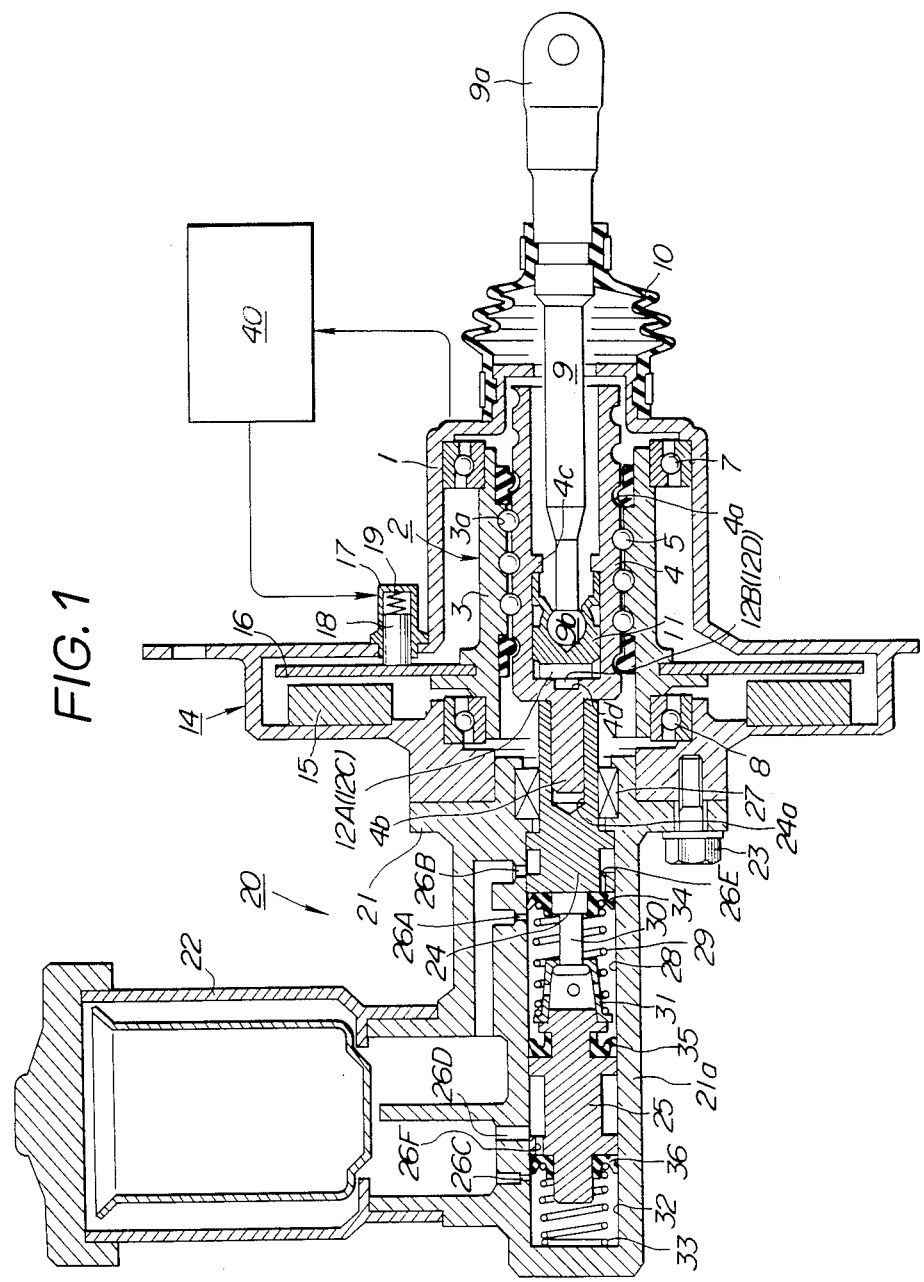
FIG. 1 is a longitudinal cross-sectional view of a motor-operated brake system according to an embodiment of the present invention.

As illustrated in FIG. 1, a ball screw mechanism 2 includes a nut member 3 disposed in a casing 1 and having a helical groove 3a defined in its inner peripheral surface, the nut member 3 having its opposite ends rotatably supported in the casing 1 by bearings 7, 8, a tubular shaft 4 extending axially through the nut member 3 and having a helical groove 4a defined in its outer peripheral surface in radial registry with the helical groove 3a of the nut member 3, and a plurality of balls 5 rollingly riding in the helical grooves 3a, 4a and movable through a circulatory path (not shown) defined in the nut member 3 as the nut member 3 rotates.

The tubular shaft 4 has an open end and a closed end which are axially spaced from each other. The tubular shaft 4 also has an output rod 4b integral with the closed end. A push rod 9 is inserted in and parallel to the tubular shaft 4, and has a yoke 9a on its outer end and a spherical ember 9b on its inner end. The yoke 9a is coupled to a brake pedal (not shown), so that when the brake pedal is depressed, a thrust force is axially applied to the push rod 9. The push rod 9 is supported at its outer portion near the yoke 9a on the casing 1 by means of an elastomeric boot 10. The spherical member 9b is supported in a spherical bearing 11. The spherical bearing 11 is disposed in the tubular shaft 4 and is slightly movable axially therein. The spherical bearing 11 has one end engageable by a radially inward ridge 4c of the tubular shaft 4 which limits axial movement of the spherical bearing 11 to a certain range.

Between the closed end of the tubular shaft 4 and the spherical bearing 11, there is disposed a thrust detector 12 in the form of a bridge circuit comprising four strain gages 12A, 12B, 12C, 12D (FIG. 2) with their electric resistances variable by an applied pressure or strain. The strain gages 12A, 12C on a pair of opposite arms of the bridge circuit are located between the closed end of the tubular shaft 4 and the spherical bearing 11 for detecting the thrust force of the push rod 9. The strain gages 12B, 12D on the other pair of opposite arms are positioned in a recess 4d defined in the closed end of the tubular shaft 4 for effecting temperature compensation.

The bridge circuit of these strain gages produce at its output terminals output signals $S_{O1}$, $S_{O2}$ that are temperature-compensated, as shown in FIG. 4, which are applied to a control device 40, as described later on.

An electric motor 14 comprises magnets 15 fixed to an inner surface of the casing 1, a disc-shaped rotor 16, and a brush 18. The rotor 16 is fixed to the nut member 3 of the ball screw mechanism 2 substantially perpendicularly to the axis of the push rod 9 for rotation therewith. The electric motor 14 also includes an armature winding and a commutator (not shown) which are formed on the rotor 16 as printed circuits. The brush 18 which is housed in a brush holder 17 mounted on the casing 1 is pressed in contact with the commutator on the rotor 16 under the resiliency of a spring 19 acting on the brush 18. Operation of the electric motor 14 is controlled by the control device 40.

When the electric motor 14 is energized, the nut member 3 rotates with the rotor 16 to axially displace the tubular shaft 4 (to the left in FIG. 1) for thereby amplifying the thrust force of the push rod 9.

A master cylinder 20 comprises a cylinder body 21 having a cylinder 21a and a reservoir tank 22 mounted on the cylinder body 21. The cylinder body 21 is fixed to an end of the casing 1 by means of bolts 23 such that the cylinder 21a is substantially coaxial with the push rod 9. The cylinder 21a accommodates therein a first piston 24 and a second piston 25, and has two ports 26A, 26B near the first piston 24 and two ports 26C, 26D near the second piston 25, the ports 26A, 26B, 26C, 26D communicating with the reservoir tank 22. The first piston 24 has a hole 24a defined in its rear end portion and in which the output rod 4b is fitted. The rear end of the first piston 24 is held against the closed end of the tubular shaft 4. Thus, the first pison 24 is axially movable (to the left in FIG. 1) when pushed by the tubular shaft 4. An oil seal 27 is disposed between the rear end portion of the first piston 24 and the cylinder 21a. The first and second pistons 24, 25 define a first pressure chamber 28 therebetween, with a spring 29 disposed under compression between the first and second pistons 24, 25. A connecting rod 30 is attached axially to the front end of the first piston 24. When the first piston 24 returns (to the right in FIG. 1), the connecting rod 30 engages an engaging member 31 fixed to the rear end of the second piston 25, so that the second piston 25 moves with the first piston 24 upon returning travel. A second pressure chamber 32 is defined between the front end of the second piston 25 and the cylinder body 21, with a spring 33 held under compression therebetween. The pressure chambers 28, 32 are sealed by cup-shaped seal members 34, 35, 36, and connected to respective braking mechanisms through separate pipes and wheel cylinders (not shown) for applying a braking force to wheels under hydraulic pressure.

When the first piston 24 is pushed by the tubular shaft 4 to produce a thrust force, the second piston 25 is pushed under the resiliency of the spring 29, and the ports 26A, 26C are closed by the respective seal members 34, 36, whereupon a hydraulic pressure is developed in the pressure chambers 28, 32. The hydraulic pressure is transmitted via the pipes to the braking mechanisms associated with the respective wheels. As the push rod 9 is released, the first and second pistons 24, 25 are moved to the right under the hydraulic pressure in the pipes and the bias of the springs 29, 33 for thereby allowing the braking fluid to return from the pipes into the pressure chambers 28, 32. At this time, a braking fluid is also allowed to flow through holes 26E, 26F defined in the pistons 24, 25 into the pressure chambers 28, 32.

Figure 2:
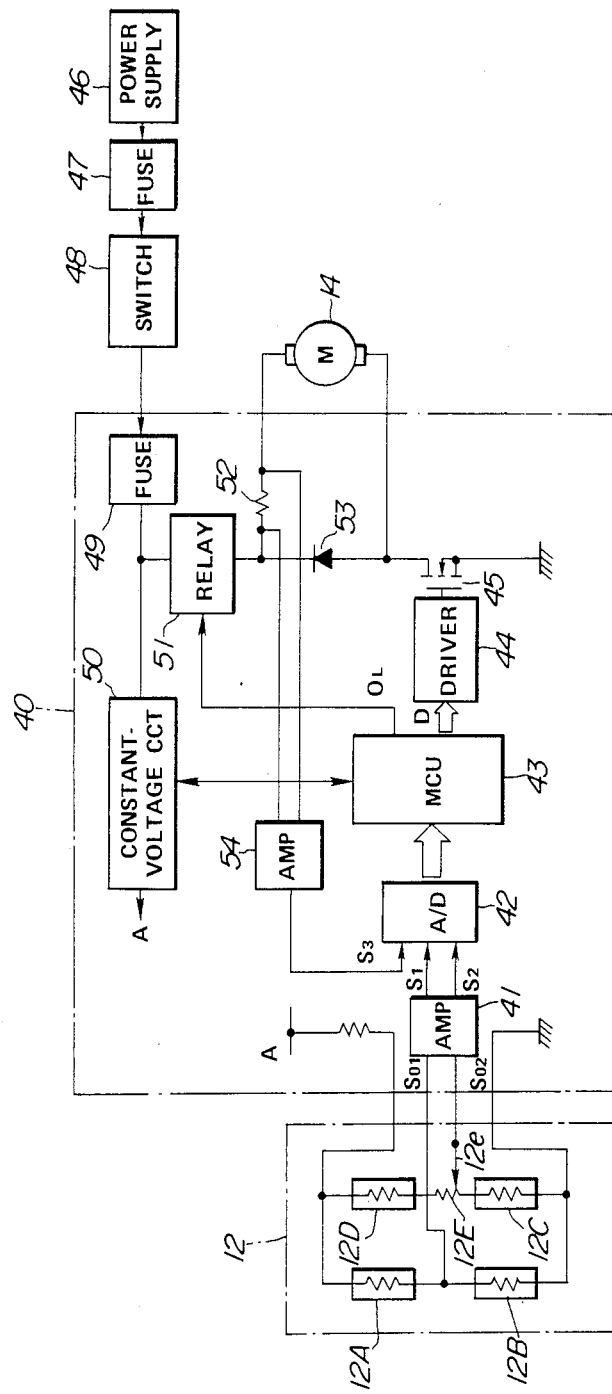

The control device 40 and its associated components will be described with reference to FIG. 2.

The junction between the strain gages 12B, 12C is connected to the negative terminal of a power supply 46 which may be an automobile-mounted battery. The junction between the strain gages 12A, 12D is connected to an A power source of a constant-voltage circuit 50. Between the strain gages 12C, 12D, there is coupled a variable resistor 12E for zero adjustment. The output signals $S_{O1}$, $S_{O2}$ are supplied from the junction between the strain gages 12A, 12B and a movable contact 12e of the variable resistor 12E. The output signals $S_{O1}$, $S_{O2}$ applied to the control device 40 are amplified by an amplifier 41 and impressed as detected signals $S_1$, $S_2$ on a microcomputer circuit (MCU) 43 through an A/D converter 42. The MCU 43 comprises a CPU, a clock pulse generator, a ROM, a RAM, and an I/O port, and is operated by control software, described later. The output port of the MCU 43 is connected to a relay circuit 51 and a driver circuit 44.

The control device 40 is energized by a power supply circuit including the power supply 46 which is connected through a fuse circuit 47 and an ignition key switch circuit 48 to a fuse circuit 49 in the control device 40. The output terminal of the fuse circuit 49 is coupled to the constant-voltage circuit 50 which supplies a constant voltage to the control device 40 and the relay circuit 51 which is turned selectively on and off by a command signal $O_L$ from the MCU 43. The MCU 43 is also connected to the constant-voltage circuit 50. When the power supply is switched on, the MCU 43 receives a reset signal from the constant-voltage circuit 50 and enables a timer in the MCU 43 to check whether the CPU operates normally or not. The output terminal of the relay circuit 51 is connected to a resistor 52 for detecting an armature current, the electric motor 14, and an FET 45 in series. The FET 45 has a drain terminal connected to the electric motor 14, a source terminal connected to the negative terminal of the power supply, and a gate terminal connected to the output terminal of the driver circuit 44. The voltage developed across the resistor 52 is applied via an amplifier circuit 54 as a detected current signal $S_3$ to the A/D converter 42. A diode 53 is connected in a reverse direction across the series-connected resistor 52 and electric motor 14.

Operation of the control device 40 will be described with reference to the control software shown in FIG. 3.

When the switch circuit 48 is turned on, a reset signal is applied from the constant-voltage circuit 50 to the MCU 43 which starts its operation in a step $P_0$. Then, data in the register in the CPU and the RAM are cleared, and the I/O port is initilized in a step $P_1$. A step $P_2$ reads in a detected current signal $S_3$ and ascertains whether it is zero or not. If zero, then a relay signal $O_L$ is issued to turn on the relay circuit 51, and if not, then the relay circuit 51 is de-energized, and an initial failure diagnosis is effected.

A step $P_3$ reads in detected thrust signals $S_1$, $S_2$ from the thrust detector 12. Then, a step $P_4$ carries out the caculation: $(S_1+S_2)/2$ and checks if this value falls within a prescribed range. If not in the prescribed range, then it is determined that the thrust detector 12 is out of order, and the relay circuit 51 is turned off to stop the operation of the electric motor 14. If in the prescribed range, then control goes to a step $P_5$ to calcuate the thrust force $S=S_1-S_2$, followed by a step $P_6$ which fetches stored data addressed by the thrust force S from a look-up table. The look-up table stores control signals (control duty ratios) D for the electric motor 14 in relation to thrust forces S. In a step $P_7$, a fetched control signal D is applied to the driver circuit 44 which coverts the control signal D to a PWM signal to control the duty ratio of the FET 45 for thereby controlling the operation of the electric motor 14. The signal $S_3$ indicative of the armature current of the electric motor 14 at this time is read in a step $P_8$. A next step $P_9$ ascertains whether the read signal $S_3$ is of a normal value or not. If the signal $S_3$ is normal in the step $P_9$, then control returns to the step $P_3$ to repeat the above process. If not normal, then the relay circuit 51 is turned off to shut off the electric motor 14.

When the brake pedal is depressed to produce a thrust force li (FIG. 6) on the push rod 9, therefore, a rotational force corresponding to the thrust force li and based on the look-up table is generated by the electric motor 14. The rotational force of the electric motor 14 is then converted by the ball screw mechanism 2 to an axial displacement of the push rod 9, which is then imparted to the first piston 24. The thrust force (output force) of the first piston 24, as indicated by lo in FIG. 6, enables the master cylinder 20 to produce a hydraulic pressure commensurate with the thrust force on the push rod 9.

With the present invention, as described above, the electric motor is employed, rather than an engine intake vacuum, to produce a power source for the servo mechanism. Therefore, even when the engine is not in operation, a sufficient braking force can be generated by the brake system. The braking force can be controlled in smaller increments as the detected signal representing the thrust force on the push rod is processed. Since sufficient braking forces can be obtained by the small-capacity electric motor, the entire brake system may be small in size, requires a small installation space, and can be arranged with greater freedom in an engine compartment. Inasmuch as no engine intake vacuum is relied upon, difficulty in the layout of vacuum pipes is not encountered.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

I claim:

1. A motor-operated brake system comprising:
an input rod coupled to a brake pedal and displaceable with an axial thrust force commensurate with the depressing force on the brake pedal;
cylinder means having at least one piston operable by the thrust force applied to said input rod for producing hydraulic pressure;
hydraulic pressure transmitting means for transmitting the hydraulic pressure generated by said cylinder means to braking mechanism associated respectively with wheels;
servo means including an electric motor for producing rotational motion and a converting mechanism for converting the rotational motion from said electric motor to linear motion and transmitting the linear motion to said piston of the cylinder means, said servo means being arranged to apply an amplified force to said piston of the cylinder means, said electric motor having a disc-shaped rotor disposed substantially perpendicular to the axis of said input rod;
thrust detecting means for detecting the magnitude of the thrust force applied to said input rod; and
control means responsive to a signal from said thrust detecting means for generating a motor control signal to control operation of said electric motor.

2. A motor-operated brake system comprising:
an input rod coupled to a brake pedal and
displaceable with an axial thrust force commensurate with the depressing force on the brake pedal;
cylinder means having at least one piston operable by the thrust force applied to said input rod for producing hydraulic pressure;
hydraulic pressure transmitting means for transmitting the hydraulic pressure generated by said cylinder means to braking mechanisms associated respectively with wheels;
servo means including an electric motor for producing rotational motion and a converting mechanism for converting the rotational motion from said electric motor to linear motion and transmitting the linear motion to said piston of the cylinder means, said servo means being arranged to apply an amplified force to said piston of the cylinder means;
said servo means including a casing, said converting mechanism comprising a nut member having a first helical groove defined in an inner peripheral surface thereof and having opposite ends rotatably supported in said casing, a tubular shaft extending through said nut member and having a second helical groove held in radial registry with said first helical groove, and a plurality of balls rollingly riding in said first and second helical grooves;
thrust detecting means for detecting the magnitude of the thrust force applied to said input rod; and
control means for generating a motor control signal to control operation of said electric motor.

3. A motor-operated brake system according to claim 2, wherein said electric motor has a rotor, said nut member being fixed to said rotor for rotation in unison therewith.

* * * * *